(12) United States Patent
Biler et al.

(10) Patent No.: US 8,493,713 B2
(45) Date of Patent: Jul. 23, 2013

(54) CONDUCTIVE COATING FOR USE IN ELECTROLYTIC CAPACITORS

(75) Inventors: Martin Biler, Novy Jicin (CZ); Lubomir Kubac, Rybitvi (CZ); Jiri Akrman, Lazne Bohdanec (CZ)

(73) Assignee: AVX Corporation, Fountain Inn, SC (US)

( * ) Notice: Subject to any disclaimer, the term of this patent is extended or adjusted under 35 U.S.C. 154(b) by 289 days.

(21) Appl. No.: 12/967,152

(22) Filed: Dec. 14, 2010

(65) Prior Publication Data
US 2012/0147528 A1 Jun. 14, 2012

(51) Int. Cl.
*H01G 9/02* (2006.01)
(52) U.S. Cl.
USPC .......................... 361/525; 29/25.03
(58) Field of Classification Search
USPC .................. 361/502, 503; 29/25.03
See application file for complete search history.

(56) References Cited

U.S. PATENT DOCUMENTS

| | | | |
|---|---|---|---|
| 2,453,103 A | 11/1948 | Turnbill, Jr. | |
| 3,345,545 A | 10/1967 | Bourgault et al. | |
| 4,945,452 A | 7/1990 | Sturmer et al. | |
| 5,111,327 A | 5/1992 | Blohm et al. | |
| 5,300,575 A | 4/1994 | Jonas et al. | |
| 5,344,902 A | 9/1994 | Harwood et al. | |
| 5,370,981 A | 12/1994 | Krafft et al. | |
| 5,457,862 A | 10/1995 | Sakata et al. | |
| 5,463,056 A | 10/1995 | Jonas | |
| 5,473,503 A | 12/1995 | Sakata et al. | |
| 5,519,147 A | 5/1996 | Swager et al. | |
| 5,729,428 A | 3/1998 | Sakata et al. | |
| 5,812,367 A | 9/1998 | Kudoh et al. | |
| 5,949,639 A | 9/1999 | Maeda et al. | |
| 6,191,936 B1 | 2/2001 | Webber et al. | |
| 6,197,252 B1 | 3/2001 | Bishop et al. | |

(Continued)

FOREIGN PATENT DOCUMENTS

| | | |
|---|---|---|
| CZ | 301500 | 3/2010 |
| EP | 0409124 A2 | 1/1991 |

(Continued)

OTHER PUBLICATIONS

Related U.S. Patent Application Form.

(Continued)

*Primary Examiner* — Eric Thomas
(74) *Attorney, Agent, or Firm* — Dority & Manning, P.A.

(57) ABSTRACT

A dispersion that contains an intrinsically conductive polythiophene formed via poly(ionic liquid)-mediated polymerization is provided. Without intending to be limited by theory, it is believed that a thiophene monomer can polymerize along the chains of a poly(ionic liquid). In this manner, the poly (ionic liquid) may act as a template for polymerization to provide a particle dispersion that is substantially homogeneous and stable. Such dispersions may be employed in an electrolytic capacitor as a solid electrolyte and/or as a conductive coating that is electrical communication with the electrolyte. Regardless, the dispersion may be more easily and cost effectively formed and incorporated into the structure of the capacitor. Moreover, due to the presence of the ionic liquid, the dispersion is conductive and does not require the addition of conventional dopants, such as polystyrene sulfonic acid. For example, the dispersion may have a specific conductivity, in the dry state, of about 1 Siemen per centimeter ("S/cm") or more, in some embodiments about 10 S/cm or more, in some embodiments about 20 S/cm or more, and in some embodiments, from about 50 to about 500 S/cm.

26 Claims, 1 Drawing Sheet

U.S. PATENT DOCUMENTS

| | | |
|---|---|---|
| 6,322,912 B1 | 11/2001 | Fife |
| 6,369,239 B2 | 4/2002 | Rauchschwalbe et al. |
| 6,391,275 B1 | 5/2002 | Fife |
| 6,416,730 B1 | 7/2002 | Fife |
| 6,527,937 B2 | 3/2003 | Fife |
| 6,528,662 B2 | 3/2003 | Jonas |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,756,473 B2 | 6/2004 | Reuter et al. |
| 6,852,830 B2 | 2/2005 | Groenendaal et al. |
| 6,891,016 B2 | 5/2005 | Reuter et al. |
| 6,927,298 B2 | 8/2005 | Groenendaal et al. |
| 6,987,663 B2 | 1/2006 | Merker et al. |
| 7,053,174 B2 | 5/2006 | Kirchmeyer et al. |
| 7,094,865 B2 | 8/2006 | Groenendaal et al. |
| 7,102,016 B2 | 9/2006 | Reuter |
| 7,105,237 B2 | 9/2006 | Sotzing |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,262,511 B2 | 8/2007 | Osako et al. |
| 7,279,015 B2 | 10/2007 | Merker |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,438,832 B2 | 10/2008 | Majumdar et al. |
| 7,449,588 B2 | 11/2008 | Jonas et al. |
| 7,515,396 B2 | 4/2009 | Biler |
| 7,569,158 B2 | 8/2009 | Waller et al. |
| 7,578,859 B2 | 8/2009 | Reynolds et al. |
| 7,585,983 B2 | 9/2009 | Reuter et al. |
| 7,601,871 B2 | 10/2009 | Siggel et al. |
| 7,641,807 B2 | 1/2010 | Siggel et al. |
| 7,696,669 B2 | 4/2010 | Kudoh |
| 7,714,124 B2 | 5/2010 | Scheibel et al. |
| 7,736,398 B2 | 6/2010 | Tateishi et al. |
| 7,745,520 B2 | 6/2010 | Shao et al. |
| 7,750,099 B2 | 7/2010 | Chikusa et al. |
| 7,754,053 B2 | 7/2010 | Maase |
| 7,785,493 B2 | 8/2010 | Jonas et al. |
| 2003/0215571 A1 | 11/2003 | Tahon et al. |
| 2005/0065352 A1 | 3/2005 | Brassat et al. |
| 2006/0180797 A1 | 8/2006 | Merker et al. |
| 2007/0064376 A1 | 3/2007 | Merker et al. |
| 2007/0139862 A1 | 6/2007 | Tateishi et al. |
| 2008/0005878 A1 | 1/2008 | Merker et al. |
| 2008/0210858 A1 | 9/2008 | Armstrong et al. |
| 2008/0218942 A1 | 9/2008 | Yamagishi et al. |
| 2009/0030149 A1 | 1/2009 | Morita et al. |
| 2009/0296317 A1 | 12/2009 | Naoi et al. |
| 2009/0310285 A1 | 12/2009 | Reuter et al. |
| 2009/0318710 A1 | 12/2009 | Brassat et al. |
| 2009/0320771 A1 | 12/2009 | Torres, Jr. et al. |
| 2010/0084600 A1 | 4/2010 | Ahmad et al. |
| 2010/0148124 A1 | 6/2010 | Reuter et al. |

FOREIGN PATENT DOCUMENTS

| | | |
|---|---|---|
| EP | 0409124 A3 | 1/1991 |
| EP | 0440097 | 8/1991 |
| JP | 2006024708 A * | 1/2006 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Abstract of Article—Lee et al., "Electra-Conductive properties of poly(3,4-ethylenedioxythiophene)/poly(ionic liquid) films with respect to its structure and morphology," Synthetic Metal, vol. 159, Issues 23-24, Dec. 2009, pp. 2453-2457.

Abstract of Article—Pozo-Gonzalo et al., "PEDOT:Poly(1-vinyl-3-ethylimidazolium) dispersions as alternative materials for optoelectronic devices," Journal of Polymer Science, Part A: Polymer Chemistry, vol. 46, Issue 9, May 1, 2008 (Mar. 24, 2008), pp. 3150-3154.

Article—Cutler at al., "Alkoxysulfonate-Functionalized PEDOT Polyelectrolyte Multilayer Films: Electrochromic and Hole Transport Materials," Macromolecules, vol. 38, No. 8, 2005, pp. 3068-3074.

Article—Groenendaal et al., "Poly(3,4-ethylenedioxythiophene) and Its Derivatives: Past, Present, and Future," Advanced Materials, vol. 12, No. 7, 2000, pp. 481-494.

Article—Kim et al., "Poly(3,4-ethylenedioxyth Derived from Poly(ionic liquid) for the Use as Hole-Injecting Material in Organic Light-Emitting Diodes," Macromolecular Rapid Communications, vol. 30, 2009, pp. 1477-1482.

Article—Hain et al., "Electric Conductance of Films Prepared from Polymeric Composite Nanoparticles," Marcromol. Symp., vol. 268, 2008, pp. 61-65.

Article—Stéphan et al., "Electrochemical behaviour of 3,4-ethylenedioxythiophene functionalized by a sulphonate group. Application to the preparation of poly(3,4-ethylenedioxythiophene) having permanent cation-exchange properties," Journal of Electroanalytical Chemistry, vol. 443, 1998, pp. 217-226.

Article—Tran-Van et al., "Sulfonated polythiophene and poly(3,4-ethylenedioxythiophene) derivatives with cations exchange properties," Synthetic Metals, vol. 142, 2004, pp. 251-258.

Article—Neil Winterton, "Solubilization of polymers by ionic liquids," J. Mater. Chem., vol. 16, 2006, pp. 4281-4293.

Article—Zotti et al., "Electrochemical and Chemical Synthesis and Characterization of Sulfonated Poly(3,4-ethylenedioxythiophene): Water-Soluble and Highly Conductive Conjugated Oligomer," Macromol. Chem. Phys., vol. 203, No. 13, 2002, pp. 1958-1964.

Product Information from Strem Chemicals, Inc. on Ionic Liquids, 2008, 2 pages.

Thesis—Jennifer Nicole DeCerbo, 1-Alkyl-3-Methylimidazolium Bis(pentafluoroethylsulfonyl)imide Based Ionic Liquids: A Study of Their Physical and Electrochemical Properties, Wright State University, 2008, 12 pages.

Search Report for GB1120301.5 dated Mar. 23, 2012, 3 pages.

* cited by examiner

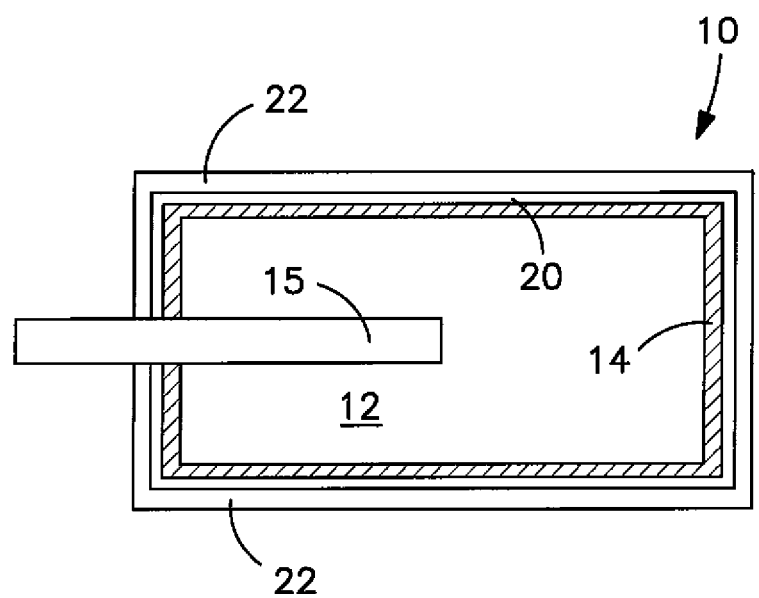

CONDUCTIVE COATING FOR USE IN ELECTROLYTIC CAPACITORS

BACKGROUND OF THE INVENTION

Solid electrolytic capacitors (e.g., tantalum capacitors) are often formed by pressing a metal powder (e.g., tantalum) around a metal lead wire, sintering the pressed part, anodizing the sintered anode, and thereafter applying a solid electrolyte. The solid electrolyte layer may be formed from a conductive polymer, such as described in U.S. Pat. Nos. 5,457,862 to Sakata, et al., 5,473,503 to Sakata, et al., 5,729,428 to Sakata, et al., and 5,812,367 to Kudoh, et al. The conductive polymer electrolyte is traditionally formed by sequentially dipping the part into separate solutions of the monomer used to form the polymer, as well as the catalyst and dopant for the monomer. One problem with this technique is that it is often difficult and costly to achieve a relatively thick solid electrolyte, which is helpful for achieving good mechanical robustness and electrical performance. Also, such polymers can also delaminate from the part during encapsulation of the capacitor, which adversely impacts electrical performance. Some attempts have been made to address this problem. U.S. Pat. No. 6,987,663 to Merker, et al., for instance, describes the use of a polymeric dispersion that covers a surface of the solid electrolyte. The polymeric dispersion generally includes poly(3,4-ethylenedioxythiophene ("PEDT") doped with a polymeric anion, such as polystyrene sulfonic acid ("PSS"). Unfortunately, the addition of such a dopant significantly increases the complexity and costs of the dispersion. Furthermore, the ability to form stable dispersions from such PEDOT/PSS systems is often difficult and typically requires the use of surfactants, binders, etc.

As such, a need remains for a solid electrolytic capacitor that possesses good mechanical robustness and electrical performance.

SUMMARY OF THE INVENTION

In accordance with one embodiment of the present invention, an electrolytic capacitor is disclosed that comprises an anode body, a dielectric overlying the anode body, and a conductive coating that overlies the dielectric. The conductive coating contains particles formed from a poly(ionic liquid) and an intrinsically conductive polythiophene.

In accordance with another embodiment of the present invention, a method of forming a solid electrolytic capacitor is disclosed. The method comprises applying a dispersion to a capacitor element that comprises an anode body and a dielectric. The dispersion includes a solvent and particles formed from a poly(ionic liquid) and an intrinsically conductive polythiophene.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying FIGURE, in which:

FIG. 1 is a cross-sectional view of one embodiment of a solid electrolytic capacitor of the present invention.

Repeat use of reference characters in the present specification and drawing is intended to represent the same or analogous features or elements of the present invention.

DETAILED DESCRIPTION OF REPRESENTATIVE EMBODIMENTS

Definitions

As used herein, the term "poly(ionic liquid)" generally refers to a polymer that is a liquid at a temperature of about 200° C. or less, in some embodiments about 150° C. or less, in some embodiments about 100° C. or less, and in some embodiments, from about 10° C. to about 60° C. By "liquid", it is meant that the polymer may have a discernible melting point (based on DSC analysis) or simply be flowable at the indicated temperature. For example, a flowable polymer may exhibit a viscosity of less than about 10,000 mPas at the indicated temperature. Thus, the liquid state of a poly(ionic liquid) is meant to encompass all of these embodiments, including the molten state and the flowable state.

As used herein, the term "heteroaryl" generally refers to a substituted or unsubstituted aromatic group of from 1 to 14 carbon atoms and 1 to 6 heteroatoms selected from oxygen, nitrogen, sulfur, and phosphorous, and includes single ring (e.g., imidazolyl) and multiple ring systems (e.g., benzimidazol-2-yl and benzimidazol-6-yl). For multiple ring systems, including fused, bridged, and spiro ring systems having aromatic and non-aromatic rings, the term "heteroaryl" applies if there is at least one ring heteroatom and the point of attachment is at an atom of an aromatic ring (e.g., 1,2,3,4-tetrahydroquinolin-6-yl and 5,6,7,8-tetrahydroquindin-3-yl). Examples of heteroaryl groups include pyridyl, furanyl, thienyl, thiazolyl, isothiazolyl, triazolyl, imidazolyl, imidazolinyl, oxazolyl, isoxazolyl, pyrrolyl, pyrazolyl, pyridazinyl, pyrimidinyl, purinyl, phthalazyl, naphthylpryidyl, benzofuranyl, tetrahydrobenzofuranyl, isobenzofuranyl, benzothiazolyl, benzoisothiazolyl, benzotriazolyl, indolyl, isoindolyl, indolizinyl, dihydroindolyl, indazolyl, indolinyl, benzoxazolyl, quinolyl, isoquinolyl, quinolizyl, quianazolyl, quinoxalyl, tetrahydroquinolinyl, isoquinolyl, quinazolinonyl, benzimidazolyl, benzisoxazolyl, benzothienyl, benzopyridazinyl, pteridinyl, carbazolyl, carbolinyl, phenanthridinyl, acridinyl, phenanthrolinyl, phenazinyl, phenoxazinyl, phenothiazinyl, and phthalimidyl. The heteroaryl groups may optionally be substituted with from 1 to 8 or in some embodiments 1 to 5, or 1 to 3, or 1 to 2 substituents.

As used herein, the term "heterocyclic" or "heterocycle" generally refers to a substituted or unsubstituted, saturated or partially saturated cyclic group having from 1 to 14 carbon atoms and from 1 to 6 heteroatoms selected from nitrogen, sulfur, or oxygen and includes single ring and multiple ring systems including fused, bridged, and spiro ring systems. For multiple ring systems having aromatic and/or non-aromatic rings, the terms "heterocyclic" or "heterocycle" apply when there is at least one ring heteroatom and the point of attachment is at an atom of a non-aromatic ring (e.g., decahydroquinolin-6-yl). In some embodiments, the nitrogen and/or sulfur atom(s) of the heterocyclic group are optionally oxidized to provide for the N oxide, sulfinyl, sulfonyl moieties. More specifically the heterocyclyl includes, but is not limited to, azetidinyl, tetrahydropyranyl, piperidinyl, N-methylpiperidin-3-yl, piperazinyl, N-methylpyrrolidin-3-yl, 3-pyrrolidinyl, 2-pyrrolidon-1-yl, morpholinyl, thiomorpholinyl, imidazolidinyl, and pyrrolidinyl. A prefix indicating the number of carbon atoms (e.g., $C_3$-$C_{10}$) refers to the total number of carbon atoms in the portion of the heterocyclyl group exclusive of the number of heteroatoms. "Substituted heterocyclic" or "substituted heterocycle" or "substituted heterocycloalkyl" or "substituted heterocyclyl" refers to heterocyclic groups, as defined herein, that are substituted with from 1 to 5 or in some embodiments 1 to 3 of the substituents as defined for substituted cycloalkyl. The heterocyclic groups may optionally be substituted with from 1 to 8 or in some embodiments 1 to 5, or 1 to 3, or 1 to 2 substituents.

Detailed Description

It is to be understood by one of ordinary skill in the art that the present discussion is a description of exemplary embodiments only, and is not intended as limiting the broader aspects of the present invention.

Generally speaking, the present invention is directed to a dispersion that contains an intrinsically conductive polythiophene formed via poly(ionic liquid)-mediated polymerization. Without intending to be limited by theory, it is believed that a thiophene monomer can polymerize along the chains of a poly(ionic liquid). In this manner, the poly(ionic liquid) may act as a template for polymerization to provide a particle dispersion that is substantially homogeneous and stable. Such dispersions may be employed in an electrolytic capacitor as a solid electrolyte and/or as a conductive coating that is electrical communication with the electrolyte. Regardless, the dispersion may be more easily and cost effectively formed and incorporated into the structure of the capacitor. Moreover, due to the presence of the ionic liquid, the dispersion is conductive and does not require the addition of conventional dopants, such as polystyrene sulfonic acid. For example, the dispersion may have a specific conductivity, in the dry state, of about 1 Siemen per centimeter ("S/cm") or more, in some embodiments about 10 S/cm or more, in some embodiments about 20 S/cm or more, and in some embodiments, from about 50 to about 500 S/cm.

The poly(ionic liquid) of the present invention contains a polycationic species and at least one counterion. The polycationic species contains repeating units of a monomer having at least one heteroatom (e.g., nitrogen or phosphorous) as a "cationic center." Examples of such heteroatomic monomers include, for instance, quaternary oniums having the following structures:

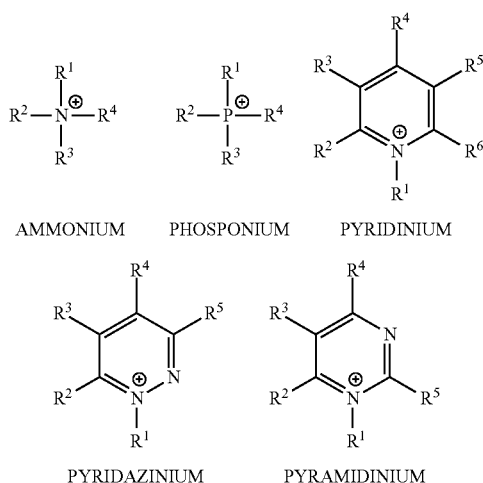

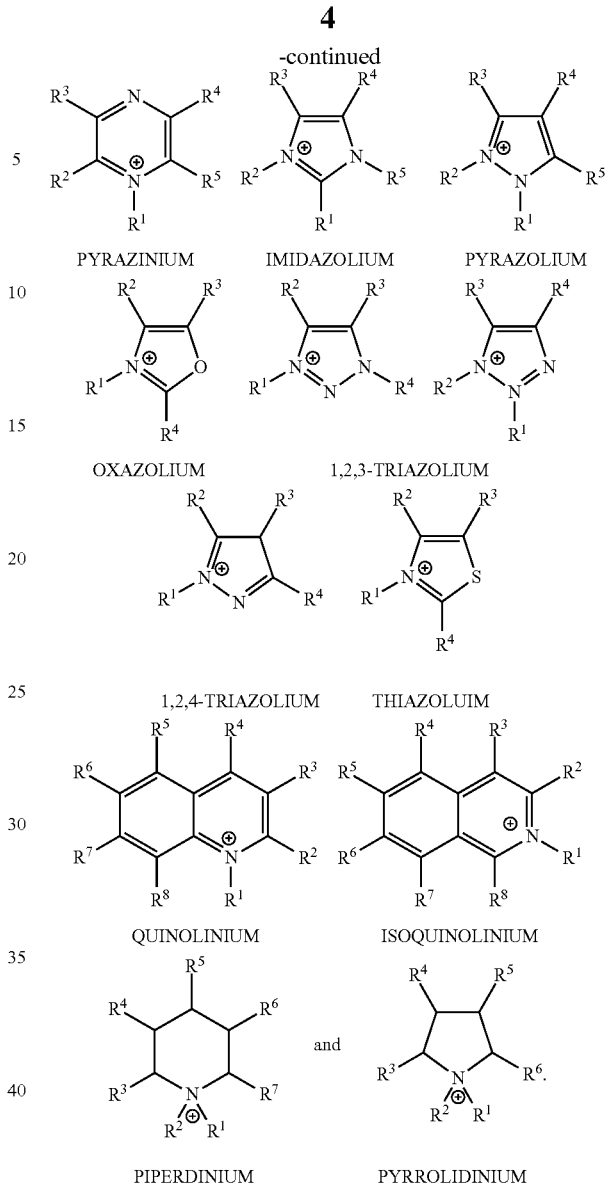

wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups (e.g., methyl, ethyl, n-propyl, isopropyl, n-butyl, isobutyl, sec-butyl, tert-butyl, n-pentyl, etc.); substituted or unsubstituted $C_3$-$C_{14}$ cycloalkyl groups (e.g., adamantyl, cyclopropyl, cyclobutyl, cyclopentyl, cyclooctyl, cyclohexenyl, etc.); substituted or unsubstituted $C_1$-$C_{10}$ alkenyl groups (e.g., ethylene, propylene, 2-methypropylene, pentylene, etc.); substituted or unsubstituted $C_2$-$C_{10}$ alkynyl groups (e.g., ethynyl, propynyl, etc.); substituted or unsubstituted $C_1$-$C_{10}$ alkoxy groups (e.g., methoxy, ethoxy, n-propoxy, isopropoxy, n-butoxy, t-butoxy, sec-butoxy, n-pentoxy, etc.); substituted or unsubstituted acyloxy groups (e.g., methacryloxy, methacryloxyethyl, etc.); substituted or unsubstituted aryl groups (e.g., phenyl); substituted or unsubstituted heteroaryl groups (e.g., pyridyl, furanyl, thienyl, thiazolyl, isothiazolyl, triazolyl, imidazolyl, isoxazolyl, pyrrolyl, pyrazolyl, pyridazinyl, pyrimidinyl, quinolyl, etc.); and so forth. In one embodiment, for example, the cationic component may be an ammonium group, such as methacryloxyethyl-triethylammonium. In other embodiments, the cationic component may be a heteroaryl or heterocyclic group, such as a pyridium, imidazolium, or pyrrolo-lidinium group. Specific examples of such groups include, for instance, diallyldimethylammonium, 1-methyl-4-vinylpyridinium, 1-vinyl-3-ethylimidazolium, and so forth.

Particularly suitable repeating units for the polycationic species may include compounds having the structures (I), (II), and/or (III):

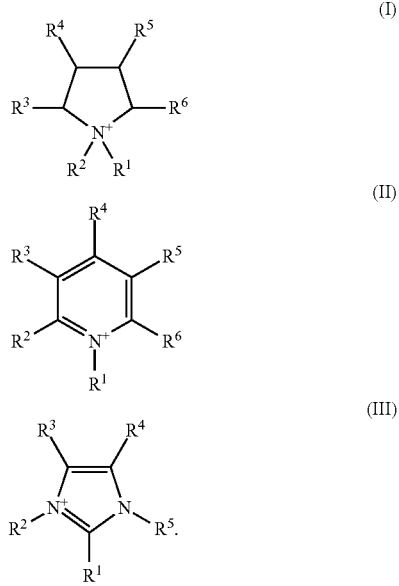

wherein, $R^1$, $R^2$, $R^3$, $R^4$, $R^5$, and $R^6$ are as defined above. In certain embodiments, for example, the polycationic species contains repeating units of the structure (I), wherein $R^1$ and $R^2$ are a $C_1$-$C_6$ alkyl (e.g., methyl), $R^3$ and $R^6$ are hydrogen, $R^4$ and $R^5$ are a $C_1$-$C_6$ alkyl group (e.g., ethyl). In other embodiments, the polycationic species contains repeating units of the structure (II), wherein $R^1$ is a $C_1$-$C_6$ alkyl (e.g., methyl), $R^2$, $R^3$, $R^5$, and $R^6$ are hydrogen, $R^4$ is a $C_1$-$C_6$ alkyl group (e.g., t-butyl). In yet other embodiments, the polycationic species contains repeating units of the structure (III), wherein $R^1$ is a $C_1$-$C_6$ alkyl (e.g., t-butyl), $R^2$, $R^3$, and $R^4$ are hydrogen, $R^5$ is a $C_1$-$C_6$ alkyl group (e.g., ethyl).

Suitable counterions for the polycationic species may include, for example, halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethylsulfonyl)imide, bis (trifluoromethylsulfonyl)imide, bis(trifluoromethyl)imide, etc.); borates (e.g., tetrafluoroborate, tetracyanoborate, bis [oxalato(2-)]borate, bis[salicylato(2-)]borate, etc.); phosphates or phosphinates (e.g., hexafluorophosphate, diethylphosphate, bis(pentafluoroethyl)phosphinate, tris (pentafluoroethyl)trifluorophosphate, tris(nonafluorobutyl) trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing. Particularly suitable counterions include chloride, bromide, hexafluorophosphate, bis(pentafluoroethylsulfonyl)imide, and oleate. As will be discussed in more detail below, the selection of a counterion may depend in part on the desired solvent system for the dispersion. For aqueous solvents (e.g., water), it is generally desired to use counterions that are generally hydrophilic in nature, such as halogens. For organic solvents, however, it is generally desired to use counterions that are generally hydrophobic in nature, such as imides, fatty acid carboxylates, etc. The desired counterion may be introduced as part of the initial monomeric salt or via an ion exchange reaction as is known in the art.

To form the poly(ionic liquid), a monomeric salt is polymerized that contains a cationic species and counterion, such as discussed above. The monomer may or may not be in the form of a liquid. By way of example only, suitable monomers may include diallyldimethylammonium chloride; 1-methyl-4-vinylpyridinium bromide; 1-vinyl-3-ethylimidazolium bromide; 1-[2-(methacryloyloxy)ethyl]-3-butyl-imidazolium tetrafluoroborate; 1-p-vinylbenzyl)-3-butyl-imidazolium tetrafluoroborate; 1-(p-vinylbenzyl)-3-methyl-imidazolium tetrafluoroborate; 1-(p-vinylbenzyl)-3-butyl-imidazolium hexafluorophosphate; 1-(p-vinylbenzyl)-3-butyl-imidazolium o-benzoic sulphimide; 1-(p-vinylbenzyl)-3-butyl-imidazolium trifluoromethane sulfonamide; (1-butylimidazolium-3)methyl-ethylene oxide; (p-vinylbenzyltrimethyl)ammonium tetrafluoroborate; (p-vinylbenzyl) triethyl ammonium tetrafluoroborate; p-vinylbenzyl)tributyl ammonium tetrafluoroborate; [2-(methacryloyloxy)ethyl]trimethyl ammonium tetrafluoroborate; (p-vinylbenzyl)trimethyl ammonium hexafluorophosphate; p-vinylbenzyl)trimethyl ammonium o-benzoic sulphimide; (p-vinylbenzyltrimethyl) ammonium trifluoromethane sulfonamide; (p-vinylbenzyl)triethyl phosphonium tetrafluoroborate; (p-vinylbenzyl)triphenyl phosphonium tetrafluoroborate; 1-(p-vinylbenzyl)pyridinium tetrafluoroborate; bis (2-hydroxyethyl)dimethyl ammonium tetrafluoroborate; 2,2-bis(methylimidazolium methyl)-1,3-propanediol tetrafluoroborate; 2,2-bis(butylimidazolium methyl)-1,3-propanediol tetrafluoroborate; and so forth. Still other examples of suitable monomeric salts for use in forming the poly(ionic liquid) are described in U.S. Pat. No. 7,714,124 to Scheibel, et al., as well as U.S. Patent Publication Nos. 2009/0320771 to Torres et al. and 2008/0210858 to Armstrong, et al., all of which are incorporated herein in their entirety by reference thereto for all purposes.

Any known polymerization technique may be employed to polymerize the monomers. In one embodiment, for example, the monomer is polymerized via free radical polymerization in the presence of a known free radical initiator, such as benzoyl peroxide or 2,2'-azo-bis-isobutyrylnitrile (AIBN). Regardless of the technique employed, the molecular weight of the resulting poly(ionic liquid) is typically from about 50,000 to about 1,000,000 grams per mole, in some embodiments from about 100,000 to about 800,000 grams per mole, and in some embodiments, from about 200,000 to about 600,000 grams per mole.

To form the conductive coating of the present invention, a precursor solution is typically formed that contains the poly (ionic liquid), as well as a thiophene monomer and oxidative catalyst. The thiophene monomer may have the following structure:

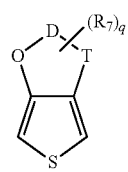

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in some embodiments, x is 0. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene monomers are those in which "D" is an optionally substituted $C_2$ to $C_3$ alkylene radical. For instance, optionally substituted 3,4-alkylenedioxythiophenes may be employed that have the general structure:

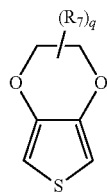

wherein, $R_7$ and q are as defined above. In one particular embodiment, "q" is 0. One commercially suitable example of 3,4-ethylenedioxthiophene is available from H.C. Starck GmbH under the designation Clevios™ M. Other suitable monomers are also described in U.S. Pat. Nos. 5,111,327 to Blohm, et al. and 6,635,729 to Groenendaal, et al., which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, are chemically polymerized in the presence of an oxidative catalyst. The oxidative catalyst may be a transition metal salt, such as a salt of an inorganic or organic acid that contain ammonium, sodium, gold, iron(III), copper(II), chromium (VI), cerium(IV), manganese(IV), manganese(VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

The amount of the poly(ionic) liquid is generally selected to achieve the desired degree of conductivity without adversely impacting polymerization of the thiophene monomer. For example, the poly(ionic liquid) may be employed in an amount of from about 0.5 moles to about 2 moles of poly(ionic) liquid per 1 mole of monomer, and in some embodiments, from about 0.8 to about 1.4 moles of poly(ionic liquid) per 1 mole of monomer. Solvents (e.g., polar protic or non-polar) may also be employed in the solution. Examples of suitable solvents include, for instance, water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. When employed, the total amount of solvents in the precursor solution may be from about 40 wt. % wt. % to about 90 wt. %, in some embodiments from about 50 wt. % to about 85 wt. %, and in some embodiments, from about 60 wt. % to about 80 wt. %.

Polymerization of the thiophene monomer generally occurs at a temperature of from about 10° C. to about 100° C., and in some embodiments, from about 15° C. to about 75° C. Upon completion of the reaction, known filtration techniques may be employed to remove any salt impurities. One or more washing steps may also be employed to purify the dispersion.

Upon polymerization, the resulting polythiophene and poly(ionic liquid) may form a complex that is represented by the following structure:

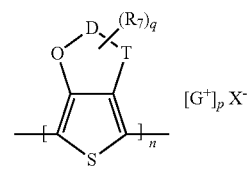

wherein,

D, T, $R_7$, and q are defined above;

G is a cationic species of the poly(ionic liquid) as described above (e.g., diallyldimethylammonium, 1-methyl-4-vinylpyridinium, or 1-vinyl-3-ethylimidazolium);

n is from 2 to 5,000, in some embodiments from 4 to 2,000, and in some embodiments, from 5 to 1,000;

p is from 2 to 5,000, in some embodiments from 4 to 2,000, and in some embodiments, from 5 to 1,000; and X is a counterion of the poly(ionic liquid) as described above (e.g., bromide, bromide, hexafluorophosphate, bis(pentafluoroethylsulfonyl)imide, or oleate). In one particular embodiment, the complex has the following structure:

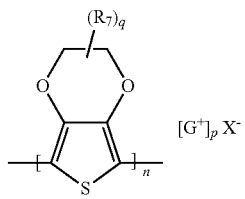

wherein, $R_7$, G, q, n, p, and X are defined above.

The complex is generally in the form of particles having a small size, such as an average diameter of from about 1 to about 200 nanometers, in some embodiments from about 2 to about 100 nanometers, and in some embodiments, from about 4 to about 50 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

Solvent(s) may likewise constitute from about 90 wt. % to about 99.9 wt. %, in some embodiments from about 95 wt. % to about 99.6 wt. %, and in some embodiments, from about 96 wt. % to about 99.5 wt. % of the dispersion. The nature of the solvent may vary depending on the intended method of application. In fact, one beneficial aspect of the present invention is that the constituents of the poly(ionic liquid) may be varied to achieve solubility in different types of solvents. In one embodiment, for example, water may be the primary solvent so that the dispersion is considered an "aqueous" dispersion. In such embodiments, water may constitute at least about 50 wt. %, in some embodiments at least about 75 wt. %, and in some embodiments, from about 90 wt. % to 100 wt. % of the solvent(s) used in the dispersion. In other embodiments, however, organic solvents (e.g., methanol, ethanol, acetone, 2-butanone, dimethylformamide, dimethylacetamide, N-methylpyrrolidone, etc.) may be employed in the dispersion. For example, organic solvents are the primary solvents employed and constitute at least about 50 wt. %, in some embodiments at least about 75 wt. %, and in some embodiments, from about 90 wt. % to 100 wt. % of the solvent(s) used in the dispersion.

A physically and chemically stable dispersion may be formed in the present invention without the need for additional components, such as polymeric anions (e.g., polystyrene sulfonic acid) conventionally required to form stable particle dispersions from polythiophenes. The dispersion of the present invention may be substantially free of such polymeric anions. Nevertheless, it should be understood that polymeric anions may be employed in certain embodiments of the present invention. When utilized, however, the polymeric anions are typically present in an amount of less than about 1 wt % of the dispersion. If desired, certain other ingredients may of course be incorporated into the dispersion. For example, the dispersion may contain a binder to further enhance the adhesive nature of the polymeric layer. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents and/or surfactants may also be employed to enhance the adhesion capacity of the binders.

The dispersion of the present invention may be employed in a wide variety of electrolytic capacitors (e.g., wet or solid) and in various different locations of such capacitors. In most embodiments, however, the dispersion is positioned so that it is in electrical communication with the dielectric of the capacitor. For example, the dispersion may be employed in a solid electrolytic capacitor so that it overlies the dielectric. One benefit of employing such a dispersion is that it may be able to penetrate into the edge region of the capacitor to achieve good electrical contact and increase the adhesion to the capacitor body. This results in a more mechanically robust part, which may reduce equivalent series resistance and leakage current. It should be understood that the use of the term "overlies" herein does not preclude the use of additional layers between the preceding layer. In certain embodiments, for example, a solid electrolyte is positioned between the dielectric and the conductive coating, yet the conductive coating is still considered to overlie the dielectric. Likewise, the conductive coating may overlie both the dielectric and a separate solid electrolyte, even though one or more layers are optionally applied between the solid electrolyte and the conductive coating. It should also be understood that the term "overlies" means simply that the particular coating or layer is applied after the preceding layer. Some portion of the coating or layer may, however, intermix or flow through the preceding layer such that the coating or layer does not strictly cover the entire preceding coating or layer. For example, when the conductive coating "overlies" the solid electrolyte, some portion of the conductive coating may nevertheless pass into the pores of the anode body where no solid electrolyte is located.

As indicated above, the positioning of the conductive coating within an electrolytic capacitor may vary as desired. Referring to FIG. 1, for example, one particular embodiment of a solid electrolytic capacitor 10 is shown that contains an anode body 12, dielectric 14, solid electrolyte 20, and an optional coating 22. The solid electrolyte 20 and/or the coating 22 may be formed from the conductive dispersion of the present invention. The conductive dispersion may be applied using a variety of known techniques, such as by dipping, spin coating, impregnation, pouring, dropwise application, injection, spraying, doctor blading, brushing or printing (e.g., inkjet, screen, or pad printing). Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the dispersion may be dried and washed. Drying may be performed at temperatures of from about −10° C. to about 250° C., and in some embodiments, from about 0° C. to about 200° C. The resulting dried coating 22 may have a thickness of from about 0.2 micrometers ("μm") to about 100 μm, in some embodiments from about 1 μm to about 40 μm, and in some embodiments, from about 3 μm to about 10 μm. It should be understood that the thickness of the coating is not necessarily the same at all locations. Nevertheless, the average thickness of the coating on the substrate generally falls within the ranges noted above.

The anode body 12 may be formed from a valve metal composition having a high specific charge, such as about 40,000 μF*V/g or more, in some embodiments about 50,000 μF*V/g or more, in some embodiments about 60,000 μF*V/g or more, and in some embodiments, from about 70,000 to about 700,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. Nos. 6,322,912 to Fife; 6,391,275 to Fife et al.; 6,416,730 to Fife et al.; 6,527,937 to Fife; 6,576,099 to Kimmel, et al.; 6,592,740 to Fife, et al.; and 6,639,787 to Kimmel, et al.; and 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the anode body 12. In one embodiment, a tantalum or niobium oxide powder having a certain particle size is first selected. For example, the particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 m²/g, in some embodiments from about 0.5 to about 5.0 m²/g, and in some embodiments from about 1.0 to about 2.0 m²/g. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 g/cm³, in some embodiments from about 0.2 to about 4.0 g/cm³, and in some embodiments, from about 0.5 to about 3.0 g/cm³.

To facilitate the construction of the anode body 12, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), naphthalene, vegetable wax, microwaxes (purified paraffins), polymer binders (e.g., polyvinyl alcohol, poly(ethyl-2-oxazoline), etc), and so forth. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The thickness of the pressed anode body may be relatively thin, such as about 4 millimeters or less, in some embodiments, from about 0.05 to about 2 millimeters, and in some embodiments, from about 0.1 to about 1 millimeter. The shape of the anode body may also be selected to improve the electrical properties of the resulting capacitor. For example, the anode body may have a shape that is curved, sinusoidal, rectangular, U-shaped, V-shaped, etc. The anode body may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. Nos. 6,191,936 to Webber, et al.; 5,949,639 to Maeda, et al.; and 3,345,545 to Bourgault et al., as well as U.S. Patent Application Publication No. 2005/0270725 to Hahn, et al., all of which are incorporated herein in their entirety by reference thereto for all purposes.

As shown in FIG. 1, an anode lead 15 may also be attached to the anode body 12. The anode lead 15 may be in the form of a wire, sheet, etc., and may be formed from a valve metal compound, such as tantalum, niobium, niobium oxide, etc. Attachment of the lead may be accomplished using known techniques, such as by welding the lead to the body 12 or embedding it within the anode body during formation.

The dielectric 14 may be formed by anodizing the anode body so that it generally coats the exterior surface of the anode body 12 and is also present within its interior pore structure. Anodization is an electrochemical process by which the anode is oxidized to form a material having a relatively high dielectric constant. For example, a tantalum anode may be anodized to tantalum pentoxide ($Ta_2O_5$). Typically, anodization is performed by initially applying an electrolyte to the anode, such as by dipping anode into the electrolyte. The electrolyte is generally in the form of a liquid, such as a solution (e.g., aqueous or non-aqueous), dispersion, melt, etc. A solvent is generally employed in the electrolyte, such as described above. The electrolyte is ionically conductive and may have an ionic conductivity of about 1 milliSiemens per centimeter ("mS/cm") or more, in some embodiments about 30 mS/cm or more, and in some embodiments, from about 40 mS/cm to about 100 mS/cm, determined at a temperature of 25° C. To enhance the ionic conductivity of the electrolyte, a compound may be employed that is capable of dissociating in the solvent to form ions. Suitable ionic compounds for this purpose may include, for instance, acids, such as hydrochloric acid, nitric acid, sulfuric acid, phosphoric acid, polyphosphoric acid, boric acid, boronic acid, etc. A current may be passed through the electrolyte to form the dielectric 14. The value of voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the surface of the anode. Of course, other known methods may also be employed, such as pulse or step potentiostatic methods. The voltage typically ranges from about 4 to about 200 V, and in some embodiments, from about 9 to about 100 V. During anodic oxidation, the electrolyte can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric 14 may be formed on a surface of the anode body 12 and within its pores.

The solid electrolyte 20 overlies the dielectric 14. The thickness of the solid electrolyte 20 may vary, but is often from about 0.1 μm to about 100 μm, in some embodiments from about 0.5 μm to about 20 μm, and in some embodiments, from about 1 μm to about 5 μm. The materials used to form the solid electrolyte 20 may vary. For example, in one embodiment, the solid electrolyte 20 may be formed from the conductive dispersion of the present invention. Likewise, the solid electrolyte 20 may be formed from other known materials. For example, manganese dioxide may be employed as the solid electrolyte. Manganese dioxide may be formed, for instance, through the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes. Alternatively, the solid electrolyte may include a conductive polymer, such as polyheterocycles (e.g., polypyrroles, polythiophenes, polyanilines, etc.), polyacetylenes, poly-p-phenylenes, polyphenolates, and so forth. Suitable polythiophenes may include, for instance, polythiophene and derivatives thereof, such as poly(3,4-ethylenedioxythiophene) ("PEDT"). Methods for forming such polythiophene derivatives are well known in the art and described, for instance, in U.S. Pat. No. 6,987,663 to Merker, et al. For example, the polythiophene derivatives may be formed from a monomeric precursor, such as 3,4-alkylenedioxythiophene, which undergoes oxidative polymerization in the presence of an oxidizing agent.

Various methods may be utilized to apply the solid electrolyte onto the anode part. In one embodiment, an oxidizing agent and a conductive polymer precursor may be applied, either sequentially or together, such that a polymerization reaction occurs in situ on the part. As an example, the monomeric precursor (e.g., 3,4-ethylenedioxythiophene) may initially be mixed with the oxidizing agent to form a solution. One suitable oxidizing agent is CLEVIOS™ C, which is iron III toluene-sulfonate and sold by H.C. Starck. CLEVIOS™ C is a commercially available catalyst for CLEVIOS™ M, which is 3,4-ethylene dioxythiophene, a PEDT monomer also sold by H.C. Starck. Once the mixture is formed, the anode part may then be dipped into the solution so that the polymer forms on the surface of the anode part. Alternatively, the oxidizing agent and precursor may also be applied separately to the anode part. In one embodiment, for example, the oxidizing agent is dissolved in an organic solvent (e.g., butanol) and then applied to the anode part as a dipping solution. The anode part may then be dried to remove the solvent therefrom. Thereafter, the anode part may be dipped into a solution containing the appropriate monomer.

As the monomer contacts the surface of the anode part containing the oxidizing agent, it may chemically polymerize thereon. Polymerization may be performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive polymer coating(s) may be described in U.S. Pat. Nos. 5,457,862 to Sakata, et al., 5,473,503 to Sakata et al., 5,729,428 to Sakata, et al., and 5,812,367 to Kudoh, et al., which are incorporated herein in their entirety by reference thereto for all purposes.

Regardless of the particular manner in which it is formed, the solid electrolyte may be healed upon application to the part. Healing may occur after each application of a solid electrolyte layer or may occur after the application of the entire coating if multiple layers are employed. In some embodiments, for example, the solid electrolyte may be healed by dipping the pellet into an electrolyte solution, such as a solution of acid, and thereafter applying a constant voltage to the solution until the current is reduced to a preselected level. If desired, such healing may be accomplished in multiple steps. After application of some or all of the layers described above, the resulting part may then be washed if desired to remove various byproducts, excess oxidizing agents, and so forth. Further, in some instances, drying may be utilized after some or all of the dipping operations described above. For example, drying may be desired after applying the oxidizing agent and/or after washing the pellet in order to open the pores of the part so that it can receive a liquid during subsequent dipping steps.

The capacitor of the present invention may optionally contain other layers in addition to those noted above. For example, a metal layer may be employed that acts as a solderable conductor, contact layer, and/or charge collector for the capacitor, and may be formed from a conductive metal, such as copper, nickel, silver, nickel, zinc, tin, palladium, lead, copper, aluminum, molybdenum, titanium, iron, zirconium, magnesium, and alloys thereof. Silver is a particularly suitable conductive metal for use in the layer. The metal layer may overlie the solid electrolyte and/or the conductive coating. A carbonaceous layer may also be employed that limits contact between the metal layer and the solid electrolyte, which would otherwise increase the resistance of the capacitor. The carbonaceous layer may be formed from a variety of known carbonaceous materials, such as graphite, activated carbon, carbon black, etc. The thickness of the carbonaceous layer is typically within the range of from about 1 μm to about 50 μm, in some embodiments from about 2 μm to about 30 μm, and in some embodiments, from about 5 μm to about 10 μm. Likewise, the thickness of the metal layer is typically within the range of from about 1 μm to about 100 μm, in some embodiments from about 5 μm to about 50 μm, and in some embodiments, from about 10 μm to about 25 μm.

The electrolytic capacitor of the present invention may also contain an anode termination to which the anode lead of the capacitor element is electrically connected and a cathode termination to which the cathode of the capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor. For instance, the thickness of the terminations may range from about 0.05 to about 1 millimeter, in some embodiments from about 0.05 to about 0.5 millimeters, and from about 0.07 to about 0.2 millimeters. The terminations may be connected using any technique known in the art, such as welding, adhesive bonding, etc. In one embodiment, for example, a conductive adhesive may initially be applied to a surface of the anode and/or cathode terminations. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes.

Once the capacitor element is attached, the lead frame may be enclosed within a casing, which may then be filled with silica or any other known encapsulating material. The width and length of the case may vary depending on the intended application. Suitable casings may include, for instance, "A", "B", "F", "G", "H", "J", "K", "L", "M", "N", "P", "R", "S", "T", "W", "Y", or "X" cases (AVX Corporation). Regardless of the case size employed, the capacitor element is encapsulated so that at least a portion of the anode and cathode terminations are exposed. In some cases, the exposed portion of the anode and cathode terminations may be located at the bottom surface of the capacitor in a "facedown" configuration for mounting onto a circuit board. This increases the volumetric efficiency of the capacitor and likewise reduces its footprint on the circuit board. After encapsulation, exposed portions of the anode and cathode terminations may be aged, screened, and trimmed to the desired size.

Test Procedures

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 100 kHz and the temperature was 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current ("DCL")

Leakage current ("DCL") was measured using a leakage test set that measures leakage current at a temperature of 25° C. and at the rated voltage after a minimum of 30 seconds.

Temperature/Pressure Test

Certain electrical properties were determined after temperature and pressure testing. More particularly, 100 samples were put into a pressure cooker filled with water for 100 hours at 125° C. The samples were then tested in the manner described above.

Example 1

The ability to form poly(3,4-ethylenedioxythiophene)/poly(diallyldimethylammonium chloride) ("PEDT/PDDA/Cl"), which has the structure below, was demonstrated:

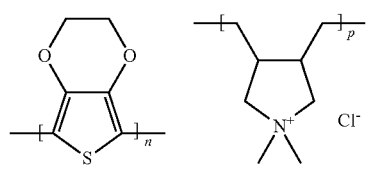

The polymer was formed as follows. A solution of 2.79 grams (0.012 mole) of ammonium peroxodisulfate (APS) in 500 milliliters of water was initially placed into a three-necked flask equipped with a stirrer and nitrogen inlet. Under vigorous stirring, a solution that contains 24.1 grams (0.03 mole) of a 20% solution of poly(diallyldimethyl-ammonium chloride) (molecular weight 400,000 grams per mole) in 500 ml water was poured into the flask. A white colored gel was obtained. Then, 1.42 grams (0.01 mol) of 3,4-ethylenedioxythiophene (FOOT) was added to this gel. The temperature was raised to 50° C. and while stirring, the mixture was kept under an inert atmosphere. After 24 hours, a dark-blue aqueous dispersion was obtained. The dispersion was purified from byproducts and unreacted EDOT by filtration and extraction by toluene.

Example 2

The ability to form poly(3,4-ethylenedioxythiophene)/poly(diallyldimethylammonium)/bis(pentafluoroethylsulfonyl)imide ("PEDOT/PDDA/PFSI"), which has the structure below, was demonstrated:

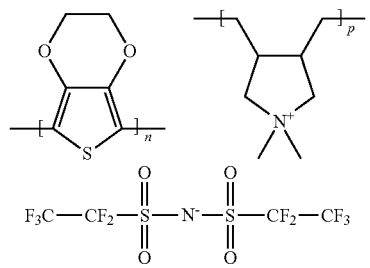

The polymer was formed as follows. Initially, 16 grams of bis(pentafluoroethylsulfonyl)imide was dissolved in 500 milliliters of water. 1,000 milliliters of the PEDT/PDDA/Cl dispersion of Example 1 was then added over 30 minutes under vigorous stirring. Precipitation of the new polymer occurred and resulted in a blue suspension, which was stirred at room temperature for 2 additional hours and recovered by filtration. The filtration cake was carefully washed by water and dried at room temperature under vacuum to a constant weight. 26 grams of the PEDOT/PDDA/PFSI polymer was obtained, which is readily dispersible in organic solvents, such as dimethylformamide, dimethylsulfoxide, dimethylacetamide or N-methylpyrrolidone.

Example 3

The ability to form poly(3,4-ethylenedioxythiophene)/poly(1-methyl-4-vinylpyridinium)/oleate ("PEDT/PDDA/OA"), which has the structure below, was demonstrated:

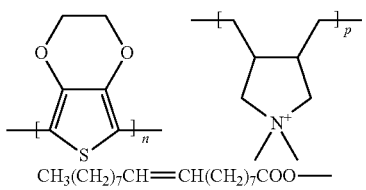

CH₃(CH₂)₇CH=CH(CH₂)₇COO—

The polymer was formed as follows. Initially, 5.64 grams (0.020 mol) of oleic acid and 0.8 grams (0.020 mol) of sodium hydroxide were dissolved in 150 milliliters of water. 500 milliliters of the PEDT/PDDA/Cl dispersion of Example 1 was gradually added under vigorous stirring. Precipitation of the blue polymer occurred and the resulting suspension was stirred for an additional 60 minutes and then filtered and dried. 8.6 grams of the PEDT/PDDA/OA polymer, which is readily dispersible in methanol, ethanol, acetone, 2-butanone or other organic solvents.

Example 4

The ability to form poly(3,4-ethylenedioxythiophene)/poly(1-vinyl-3-ethylimidazolium)/hexafluorophosphate ("PEDOT/PDDA/PF6"), which has the structure below, was demonstrated:

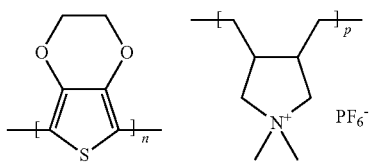

The polymer was formed as follows. Initially, a solution of 0.7 grams of ammonium hexafluorophosphate in 50 ml of water was added dropwise to a 100-milliliter dispersion of the PED/PDDA/Cl dispersion of Example 1 under vigorous stirring. The resulting polymer was precipitated and then recovered by filtration. This polymer is readily dispersible in dimethylformamide, dimethylacetamide and N-methylpyrrolidone.

Example 5

A tantalum anode with a size of 1.70 mm×1.05 mm×2.4 mm was anodized at 13.5V in a liquid electrolyte (aqueous solution of orthophosphoric acid) to 100 μF. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a layer of poly(3,4-ethylenedioxythiophene) was formed on the surface of the dielectric. The parts were washed in methanol to remove reaction by-products, re-anodized in a liquid electrolyte (aqueous solution of 4-toluene sulfonic acid), and washed again in methanol. The polymerization cycle was repeated 4 times. Thereafter, the part was dipped into a dispersed poly(3,4-ethylenedioxythiophene)/poly(diallyldimethylammonium)/bis(pentafluoroethylsulfonyl)imide ("PEDOT/PDDA/PFSI"—Example 2) having a solids content 2% and dried at 125° C. for 20 minutes. Once again, this process was repeated 2 times.

The parts were then coated by graphite and dipping silver and assembled by gluing the anodes into a leadframe pocket, cutting and laser welding the anode wire into the leadframe upstand, and molding the capacitor. Multiple parts (1,000 pieces) were made in this manner for testing.

Example 6

1,000 pieces of capacitors were prepared as described in Example 5, except that the poly(3,4-ethylenedioxythiophene)/poly(1-methyl-4-vinylpyridinium)/oleate ("PEDT/PDDA/OA"—Example 3) was used as the dispersed polymer.

Example 7

1,000 pieces of capacitors were prepared as described in Example 5, except that the poly(3,4-ethylenedioxythiophene)/poly(1-vinyl-3-ethylimidazolium)/hexafluorophosphate ("PEDOT/PDDA/PF6"—Example 4) was used as the dispersed polymer.

Comparative Example 1.000 pieces of capacitors were prepared as described in Example 5, except that the poly(3,4-ethylenedioxythiophene) ("Clevios™ K"—solids content of 2.1%) was used as the dispersed polymer.

The finished capacitors of Examples 6-10 and Comparative Example were then tested for electrical performance. The median results of leakage current, ESR, and capacitance are set forth below in Table 1.

TABLE 1

| | Electrical Properties | | |
|---|---|---|---|
| | DCL [μA] | ESR [mΩ] | Cap [μF] |
| Example 5 | 13.5 | 81 | 95.7 |
| Example 6 | 9.1 | 260 | 94.7 |
| Example 7 | 12.8 | 193 | 93.6 |
| Comparative Example | 28.3 | 84 | 92.8 |

100 samples of the finished capacitors of Examples 5-7 and the Comparative Example were then tested after "temperature/pressure testing" as described above. The results are shown below in Table 2.

TABLE 2

| | Electrical Properties after Temperature/Pressure Testing | | |
|---|---|---|---|
| | DCL [μA] | ESR [mΩ] | Cap [μF] |
| Example 5 | 3.1 | 75 | 98.7 |
| Example 6 | 1.1 | 253 | 98.0 |
| Example 7 | 2.7 | 189 | 97.9 |
| Comparative Example | 9.7 | 83 | 98.1 |

100 samples of the finished capacitors of Examples 5-7 and Comparative Example were then tested after three times applied "lead-free reflow" as described above. The results are shown below in Table 3.

TABLE 3

| | Electrical Properties after 3x Lead-free Reflow | | |
|---|---|---|---|
| | DCL [μA] | ESR [mΩ] | Cap [μF] |
| Example 5 | 14.1 | 82 | 95.4 |
| Example 6 | 10.2 | 264 | 94.1 |
| Example 7 | 12.9 | 198 | 92.7 |
| Comparative Example | 54.2 | 84 | 92.3 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An electrolytic capacitor comprising:
   an anode body;
   a dielectric overlying the anode body; and
   a conductive coating that overlies the dielectric, wherein the conductive coating contains particles formed from a poly(ionic liquid) and an intrinsically conductive polythiophene.

2. The electrolytic capacitor of claim 1, wherein the poly(ionic liquid) contains repeating units of a monomer that includes at least one heteroatom as a cationic center and a counterion.

3. The electrolytic capacitor of claim 2, wherein the monomer has one of the following structures:

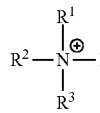
AMMONIUM

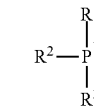
PHOSPONIUM

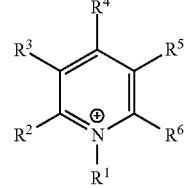
PYRIDINIUM

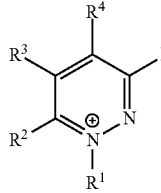
PYRIDAZINIUM    PYRAMIDINIUM

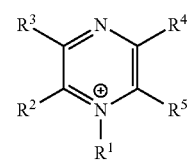
PYRAZINIUM

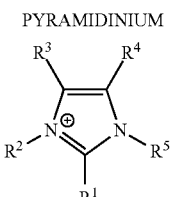
IMIDAZOLIUM

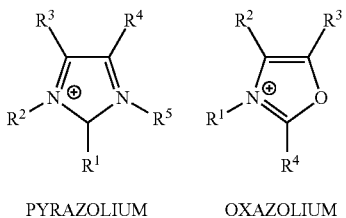
PYRAZOLIUM    OXAZOLIUM

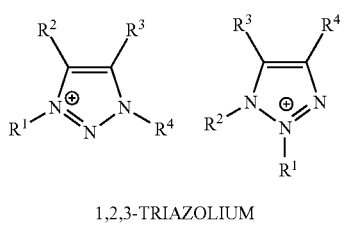
1,2,3-TRIAZOLIUM

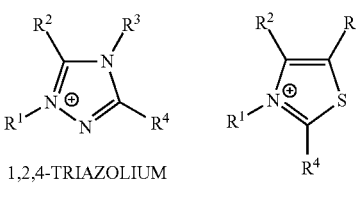
1,2,4-TRIAZOLIUM    THIAZOLIUM

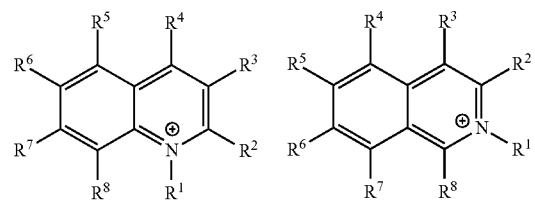
QUINOLINIUM    ISOQUINOLINIUM

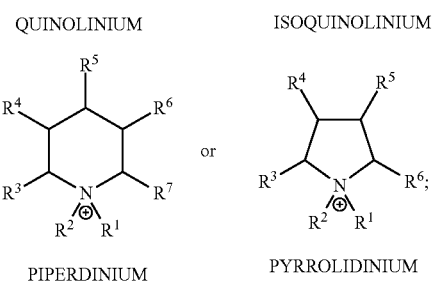
PIPERDINIUM    PYRROLIDINIUM wherein, $R^1$, $R^2$, $R^3$, $R^4$, $R^5$, $R^6$, $R^7$, and $R^8$ are independently selected from the group consisting of hydrogen; substituted or unsubstituted $C_1$-$C_{10}$ alkyl groups; substituted or unsubstituted $C_3$-$C_{14}$ cycloalkyl groups; substituted or unsubstituted $C_1$-$C_{10}$ alkenyl groups; substituted or unsubstituted $C_2$-$C_{10}$ alkynyl groups; substituted or unsubstituted $C_1$-$C_{10}$ alkoxy groups; substituted or unsubstituted acyloxy groups; substituted or unsubstituted aryl groups; substituted or unsubstituted heteroaryl groups; and combinations thereof.

4. The electrolytic capacitor of claim 2, wherein the monomer includes a heteroaryl group, heterocyclic group, or a combination thereof.

5. The electrolytic capacitor of claim 2, wherein the monomer has the structure (I):

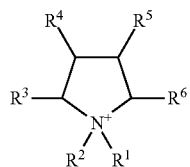

(I)

wherein, $R^1$, $R^2$, $R^4$, and $R^5$ are independently a $C_1$-$C_6$ alkyl; and
$R^3$ and $R^6$ are each hydrogen.

6. The electrolytic capacitor of claim 2, wherein the monomer has the structure (II):

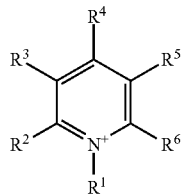

(II)

wherein, $R^1$ and $R^4$ are independently a $C_1$-$C_6$ alkyl; and
$R^2$, $R^3$, $R^5$, and $R^6$ are each hydrogen.

7. The electrolytic capacitor of claim 2, wherein the monomer has the structure (III):

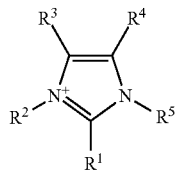

(III)

wherein, $R^1$ and $R^5$ are independently a $C_1$-$C_6$ alkyl;
$R^2$, $R^3$, and $R^4$ are each hydrogen.

8. The electrolytic capacitor of claim 2, wherein the monomer is diallyldimethylammonium, 1-methyl-4-vinylpyridinium, 1-vinyl-3-ethylimidazolium, or a combination thereof.

9. The electrolytic capacitor of claim 2, wherein the counterion includes a halogen, sulfate, sulfonate, sulfosuccinate, amide, imide, borate, phosphate, phosphinate, antimonite, aluminate, fatty acid carboxylate, cyanate, acetate, or a combination thereof.

10. The electrolytic capacitor of claim 9, wherein the counterion includes chloride, bromide, hexafluorophosphate, bis(pentafluoroethylsulfonyl)imide, oleate, or a combination thereof.

11. The electrolytic capacitor of claim 1, wherein the polythiophene has the following structure:

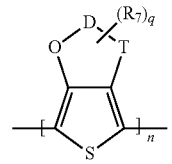

wherein,

T is O or S;
D is an optionally substituted $C_1$ to $C_5$ alkylene radical;
$R_7$ is a linear or branched, optionally substituted $C_1$ to $C_{18}$ alkyl radical; optionally substituted $C_5$ to $C_{12}$ cycloalkyl radical; optionally substituted $C_6$ to $C_{14}$ aryl radical; optionally substituted $C_7$ to $C_{18}$ aralkyl radical; optionally substituted $C_1$ to $C_4$ hydroxyalkyl radical, or hydroxyl radical; and
q is an integer from 0 to 8.

12. The electrolytic capacitor of claim 11, wherein the polythiophene has the following structure:

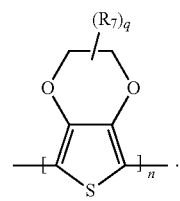

13. The electrolytic capacitor of claim 1, wherein the polythiophene is poly(3,4-ethylenedioxythiophene).

14. The electrolytic capacitor of claim 1, wherein the poly(ionic) liquid includes poly(diallyldimethylammonium chloride); poly(1-methyl-4-vinyl pyridinium bromide); poly(1-vinyl-3-ethylimidazolium bromide); poly(diallyldimethylammonium)-bis(pentafluoroethylsulfonyl)imide; poly(1-methyl-4-vinylpyridinium)oleate; poly(1-vinyl-3-ethylimidazolium)hexafluorophosphate; or a combination thereof.

15. The electrolytic capacitor of claim 1, wherein the particles have an average size of from about 1 to about 200 nanometers.

16. The electrolytic capacitor of claim 1, wherein the conductive coating is positioned adjacent to the dielectric of the capacitor.

17. The electrolytic capacitor of claim 1, further comprising a solid electrolyte that overlies the dielectric, wherein the conductive coating overlies both the dielectric and the solid electrolyte.

18. The electrolytic capacitor of claim 17, wherein the solid electrolyte contains a conductive polymer.

19. The electrolytic capacitor of claim 1, wherein the conductive coating is generally free of poly(styrene sulfonic acid).

20. The electrolytic capacitor of claim 1, wherein the anode body includes tantalum, niobium, or an electrically conductive oxide thereof.

21. A method of forming a solid electrolytic capacitor, the method comprising applying a dispersion to a capacitor element that comprises an anode body and a dielectric, wherein the dispersion includes a solvent and particles formed from a poly(ionic liquid) and an intrinsically conductive polythiophene.

22. The method of claim 21, wherein the particles constitute from about 0.1 wt. % to about 10 wt. % of the dispersion.

23. The method of claim 21, wherein the solvent includes water.

24. The method of claim 23, wherein water constitutes at least about 50 wt. % of solvents present in the dispersion.

25. The method of claim 21, wherein organic solvents constitute at least about 50 wt. % of solvents present in the dispersion.

26. The method of claim 21, wherein the capacitor element further comprises a solid electrolyte that overlies the dielectric, and wherein the dispersion is applied over the solid electrolyte.

\* \* \* \* \*